(12) United States Patent
Arunski et al.

(10) Patent No.: US 11,544,300 B2
(45) Date of Patent: Jan. 3, 2023

(54) REDUCING STORAGE REQUIRED FOR AN INDEXING STRUCTURE THROUGH INDEX MERGING

(71) Applicant: EMC IP Holding Company LLC, Hopkinton, MA (US)

(72) Inventors: Kevin J. Arunski, Sterling, VA (US); Sashka T. Davis, Vienna, VA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 288 days.

(21) Appl. No.: 16/168,257

(22) Filed: Oct. 23, 2018

(65) Prior Publication Data

US 2020/0125674 A1  Apr. 23, 2020

(51) Int. Cl.
*G06F 16/31* (2019.01)
*G06F 16/33* (2019.01)

(52) U.S. Cl.
CPC .......... *G06F 16/328* (2019.01); *G06F 16/334* (2019.01)

(58) Field of Classification Search
CPC .............................. G06F 16/328; G06F 16/334
See application file for complete search history.

(56) References Cited

U.S. PATENT DOCUMENTS

| | | | |
|---|---|---|---|
| 5,819,260 A * | 10/1998 | Lu | G06F 16/30 707/999.005 |
| 7,644,076 B1 | 1/2010 | Ramesh et al. | |
| 8,965,849 B1 * | 2/2015 | Goo | G06F 16/2246 707/634 |
| 2003/0030575 A1 * | 2/2003 | Frachtenberg | H03M 7/3088 341/51 |
| 2003/0229626 A1 * | 12/2003 | Nayak | G06F 16/319 |
| 2007/0050384 A1 * | 3/2007 | Whang | G06F 16/319 |
| 2007/0067157 A1 * | 3/2007 | Kaku | G06F 40/289 704/10 |
| 2009/0063404 A1 * | 3/2009 | Hacigumus | G06F 16/316 |

(Continued)

OTHER PUBLICATIONS

S. Huston et al., "Efficient Indexing of Repeated n-Grams," Proceedings of the Fourth ACM International Conference on Web Search and Data Mining (WSDM), Feb. 9-12, 2011, pp. 127-136.

(Continued)

*Primary Examiner* — Mark D Featherstone
*Assistant Examiner* — Tony Wu
(74) *Attorney, Agent, or Firm* — Ryan, Mason & Lewis, LLP

(57) ABSTRACT

A method includes extracting variable length strings from text data, associating the extracted strings with indexes in an indexing structure that maintain identifiers for instances of the strings in the text data, selecting a set of the strings having corresponding indexes whose size exceeds a threshold size value, and determining whether to merge a first index corresponding to a first string with a second index corresponding to a second string, the second string being a sub string of the first string, wherein the determination is based at least in part on a comparison of a first size of the first index and a second size of the second index. The method further includes merging the first index with the second index to create a merged index in the indexing structure responsive to the determination, and processing queries to the text data utilizing the indexing structure with the merged index.

20 Claims, 4 Drawing Sheets

(56) References Cited

U.S. PATENT DOCUMENTS

2009/0094236 A1* 4/2009 Renkes ............... G06F 16/2272
2015/0309984 A1* 10/2015 Bradford ............... G06F 40/263
  704/8
2018/0199054 A1* 7/2018 Hsu ........................ H04N 19/46
2019/0130902 A1* 5/2019 Itoh ........................ G06F 40/49

OTHER PUBLICATIONS

T. Hawker et al., "Practical Queries of a Massive n-gram Database," Proceedings of the Australasian Language Technology Workshop, Dec. 10-11, 2007, pp. 40-48, vol. 5.

* cited by examiner

REDUCING STORAGE REQUIRED FOR AN INDEXING STRUCTURE THROUGH INDEX MERGING

FIELD

The field relates generally to information processing, and more particularly to managing data in information processing systems.

BACKGROUND

Various information processing systems provide capabilities for searching and retrieving stored data. In systems which store or manage large amounts of data, indexing structures may be used to provide efficient query search and retrieval capabilities. An indexing structure may contain indexes for different strings of text in stored data, with each index maintaining references to or identifiers for the locations of such strings of text in the stored data. As the amount of data increases, however, the amount of storage and computing resources required to store and maintain the indexing structure also increases.

SUMMARY

Illustrative embodiments of the present invention provide techniques for adaptive index merging which improve the performance of data management systems through reducing the amount of storage resources required for an indexing structure. Further, embodiments provide efficient index merging techniques which can adapt to system constraints related to computational resources used for index merging.

In one embodiment, a method comprises extracting variable length strings from a corpus of text data, associating the extracted strings with respective indexes in an indexing structure, the indexes comprising identifiers for instances of the extracted strings in the corpus of text data, selecting a set of the strings from the indexing structure having corresponding indexes whose size exceeds a threshold size value, determining whether to merge a first index in the indexing structure corresponding to a first string with at least a second index in the indexing structure corresponding to a second string that is a substring of the first string, wherein the determination is based at least in part on a comparison of a first size of the first index and a second size of the second index, merging the first index and the second index to create a merged index in the indexing structure responsive to the determination, and processing one or more queries to the corpus of text data received from one or more client devices utilizing the indexing structure with the merged index. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
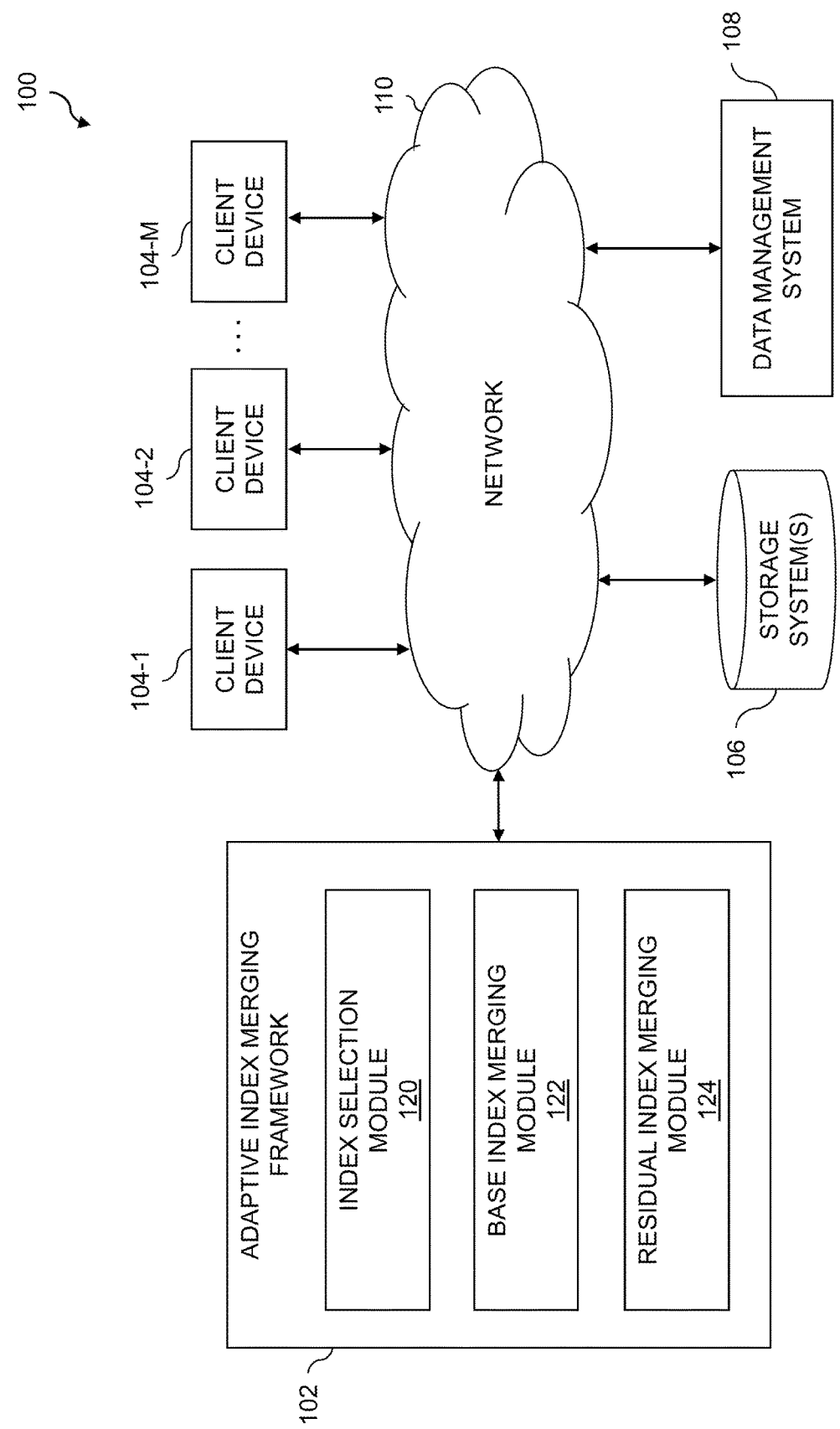
FIG. 1 is a block diagram of an information processing system for adaptive index merging in an illustrative embodiment of the invention.

FIG. 1 shows an information processing system 100 configured in accordance with an illustrative embodiment. The information processing system 100 is assumed to be built on at least one processing platform and provides functionality for efficient index merging utilizing an adaptive index merging framework 102. The adaptive index merging framework 102 manages index merging for a data management system 108, which may store records or other data in one or more storage systems 106. The data management system 108 may provide functionality for query search and retrieval of records or other data from the storage systems 106. In some embodiments, for example, the data management system 108 may comprise a log message collection and processing system for an enterprise or other entity, which collects log messages or other records from various managed devices or other log or event record sources.

The storage systems 106 may comprise one or multiple different storage systems which collectively provide a system of records for storing data managed by the data management system 108. Although shown as separate in FIG. 1, in some embodiments at least a portion of the storage systems 106 may be part of the data management system 108 or the adaptive index merging framework 102. Also, the adaptive index merging framework 102 may be implemented at least in part internally to the data management system 108.

The storage systems 106 provide data sources for records that are accessed by various users or data consumers via client devices 104-1, 104-2, . . . 104-M (collectively, client devices 104). In some embodiments, the client devices 104 submit queries or other retrieval requests to the data management system 108 for records stored in the storage systems 106. The data management system 108 may utilize an indexing structure to speed up such search and retrieval. In some embodiments, the adaptive index merging framework 102 improves the efficiency of the indexing structure through merging indexes thereof to reduce the space requirements for storing the indexing structure as well as reducing the computing resources or time required for maintaining and utilizing the indexing structure.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing devices are possible, as will be appreciated by those skilled in the art.

The adaptive index merging framework 102, client devices 104, storage system 106 and data management system 108 may be connected via at least one network 110. The network 110 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The adaptive index merging framework 102 implements a number of functional modules for merging indexes for records stored in the storage systems 106, including an index selection module 120, a base index merging module 122 and a residual index merging module 124.

The adaptive index merging framework 102 is configured to extract variable length strings (e.g., N-grams) from a corpus of text data (e.g., records stored in the storage systems 106). The adaptive index merging framework 102 further associates the extracted strings with respective indexes in an indexing structure, where the indexes comprise identifiers for instances of the extracted strings in the corpus of text data. The index selection module 120 is configured to select a set of the strings from the indexing structure having corresponding indexes whose size exceeds a threshold size value.

The base index merging module 122 and residual index merging module 124 are configured to determine whether to merge indexes in the indexing structure. More particularly, the base index merging module 122 does so for strings or N-grams of a longest length maintained by the indexing structure, and the residual index merging module 124 does so for shorter length strings or N-grams not already merged with a longer length string or N-gram. Such merging in some embodiments includes determining whether to merge a first index in the indexing structure corresponding to a first string with at least a second index in the indexing structure corresponding to a second string that is a substring of the first string. The determination is based at least in part on a comparison of a first size of the first index and a second size of the second index. The first index and the second index are merged to create a merged index in the indexing structure responsive to the determination. The adaptive index merging framework 102 then provides the indexing structure with the merged index for use in processing queries to the corpus of text data (e.g., queries received from the client devices 104).

It is to be appreciated that the particular arrangement of the adaptive index merging framework 102, client devices 104, storage systems 106 and data management system 108 illustrated in the FIG. 1 embodiment is presented by way of example only, and alternative arrangements can be used in other embodiments. As an example, the functionality associated with the index selection module 120, base index merging module 122 and residual index merging module 124 may in some embodiments be combined into fewer modules, or may be separated across more modules, with the multiple modules possibly being implemented with multiple distinct processors or processing devices. As another example, the adaptive index merging framework 102 and/or storage systems 106 may be implemented at least in part within the data management system 108.

At least portions of the index selection module 120, base index merging module 122 and residual index merging module 124 may be implemented at least in part in the form of software that is stored in memory and executed by a processor.

Figure 2:
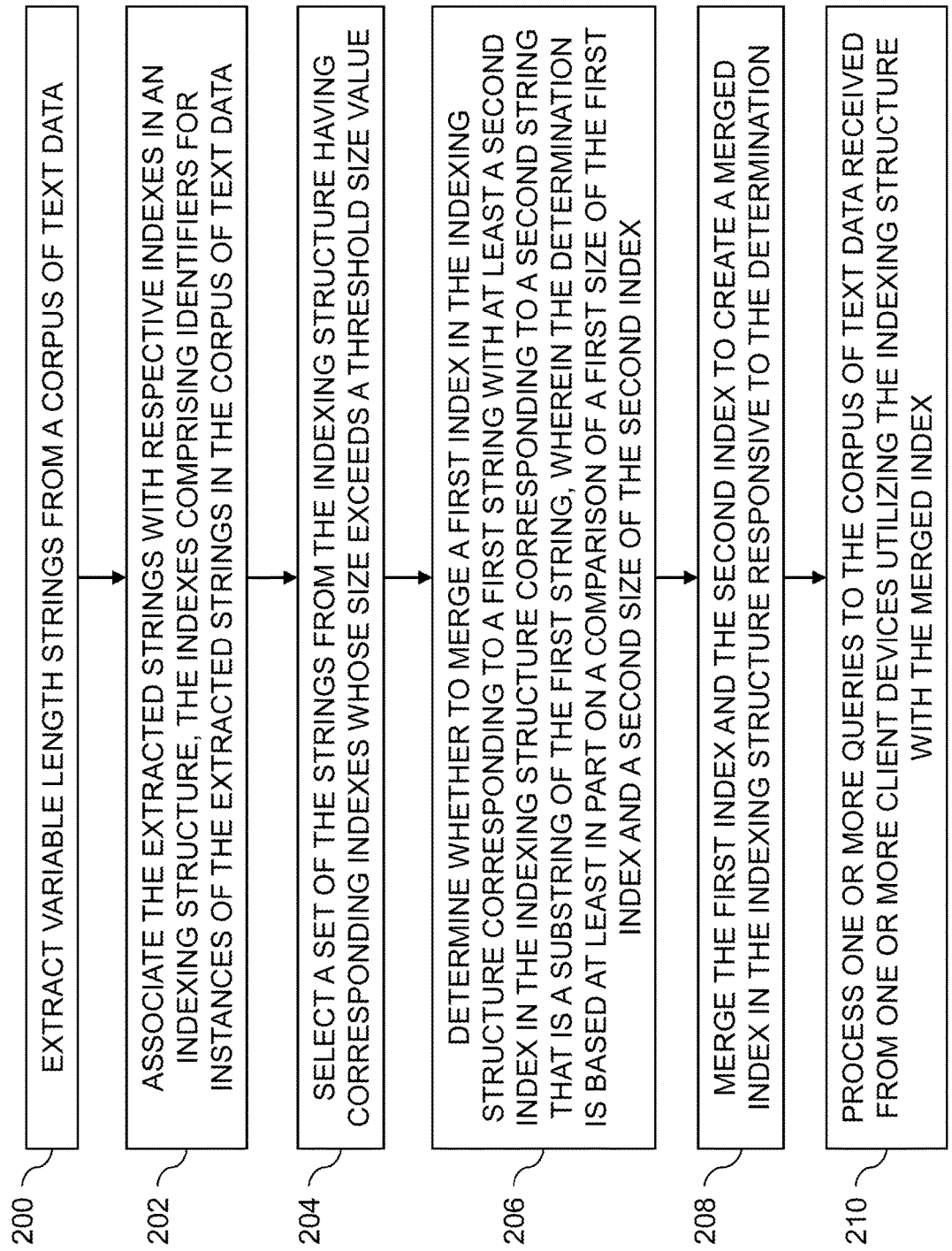
FIG. 2 is a flow diagram of an exemplary process for adaptive index merging in an illustrative embodiment.

An exemplary process for adaptive index merging will now be described in more detail with reference to the flow diagram of FIG. 2. It is to be understood that this particular process is only an example, and that additional or alternative processes for adaptive index merging can be carried out in other embodiments.

In this embodiment, the process includes steps 200 through 210. These steps are assumed to be performed by the adaptive index merging framework 102 utilizing the index selection module 120, base index merging module 122 and residual index merging module 124. The process begins with step 200, extracting variable length strings (e.g., N-grams) from a corpus of text data. In step 202, the extracted strings are associated with respective indexes in an indexing structure. The indexes comprise identifiers for instances of the extracted strings in the corpus of text data. In some embodiments, the indexing structure is maintained by or for a log message concentrator system.

In step 204, a set of the strings having corresponding indexes whose size exceeds a threshold size value are selected from the indexing structure. A determination is made in step 206 whether to merge a first index in the indexing structure corresponding to a first string with at least a second index in the indexing structure corresponding to a second string that is a substring of the first string. The step 206 determination is based at least in part on a comparison of a first size of the first index and a second size of the second index. In some embodiments the step 206 determination is based at least in part on a comparison of a threshold merging value to a ratio of the first size of the first index to the second size of the second index. The threshold merging value may be based at least in part on a length of the second string. The threshold merging value may also or alternatively be based at least in part on whether the second string is a suffix or prefix of the first string.

The first index and the second index are merged in step 208 to create a merged index responsive to the step 206 determination. The merged index reduces storage resources required to store the indexing structure.

In step 210, one or more queries to the corpus of text data received from one or more client devices are processed utilizing the indexing structure with the merged index.

In some embodiments, steps 206 and 208 are repeated for two or more of the set of strings, starting with strings or N-grams having a longest length maintained by the indexing structure, and continuing with N-grams having shorter lengths with corresponding indexes not already merged with an index of an N-gram having the longest length.

In some embodiments, step 204 includes generating respective data structures for each of two or more values of N and placing selected N-grams into the data structures corresponding to the lengths of the selected N-grams. The data structures may comprise a set of two or more hash tables each comprising N-grams for a value of N whose indexes have a size that exceeds the threshold size value.

The first string may comprise an N-gram having a longest length maintained by the indexing structure, and steps 206 and 208 may include initializing an indexing merging array, identifying a set of substrings of the first string, for each of the identified set of substrings, and determining whether: (i)

a size of the index corresponding to that substring is greater than zero; and (ii) a size of the index corresponding to that substring divided by a size of the index corresponding to the first string minus one exceeds a designated threshold merging value associated with the size of that substring. For each substring for which (i) and (ii) is true, that substring is added to the index merging array and removed from the hash table comprising N-grams for the size of that substring. If the indexing merging array is not empty, the first string is added to the index merging array, indexes for the substrings in the index merging array are merged with the index for the first string to form the merged index, the first string and the substrings in the index merging array are added to a new hash table for merged indexes, and storage resources associated with the indexes of the first string and the substrings in the index merging array are released.

Steps 206 and 208 may also be repeated for a third string that is not part of the merged index and which has a length shorter than the first string by initializing a new index merging array, identifying a set of sub strings of the third string, and, for each of the identified set of sub strings, determining whether: (i) a size of the index corresponding to that substring is greater than zero; and (ii) a size of the index corresponding to that substring divided by a size of the index corresponding to the third string minus one exceeds a designated threshold merging value associated with the size of that substring. For each substring for which (i) and (ii) is true, that sub string is added to the new index merging array and removed from the hash table comprising N-grams for the size of that substring. If the new indexing merging array is not empty, the third string is added to the new index merging array, indexes for the substrings in the new index merging array are merged with the index for the third string to form another merged index, the third string and the substrings in the new index merging array are added to the new hash table for merged indexes, and storage resources associated with the indexes of the third string and the substrings in the new index merging array are released.

In systems with constrained resources available for merging, and wherein the first string comprises an N-gram having a longest length maintained by the indexing structure, steps 206 and 208 may include initializing an index merging array, identifying a first substring comprising a beginning portion of the first string and a second substring comprising an ending portion of the first string, determining whether a size of the index corresponding to the first substring is greater than zero and if so setting a first value equal to a ratio of a size of the index of the first string to a size of the index of the first substring, and determining whether a size of the index corresponding the second substring is greater than zero and if so setting a second value equal to a ratio of the size of the index of the first string to a size of the index of the second sub string. If the first value is greater than the second value and a threshold merging value associated with the size of the first sub string, the first string and the first sub string are added to the index merging array, the first substring is removed from the hash table comprising N-grams for the size of the first substring, and storage resources associated with the indexes of the first string and the first sub string in the index merging array are released. If the second value is greater than the first value and a threshold merging value associated with the size of the second substring, the first string and the second substring are added to the index merging array, the second substring is removed from the hash table comprising N-grams for the size of the second substring, and storage resources associated with the indexes of the first string and the second sub string in the index merging array are released.

In some embodiments, steps 206 and 208 are parallelized by scanning the extracted N-grams to create two or more sets of hash tables, each set of hash tables comprising a hash table for N-grams for different values of N. A first one of the two or more sets of hash tables comprises N-grams whose indexes have a size in a first range and a second one of the two or more sets of hash tables comprises N-grams whose indexes have a size in a second range. Steps 206 and 208 may then be performed in parallel for the first string from one of the first set of hash tables and at least a third string from one of the second set of hash tables.

As described above, illustrative embodiments provide techniques for efficient query search and retrieval capabilities, such as for large collections of text records, through building an indexing structure. Variable length N-grams are extracted from text, and each N-gram is associated with an index that maintains identifiers or references to all text records that contain that N-gram string. When the number of N-grams and the sizes of the corresponding indexes grow, the space required to maintain the indexing structure will become more and more expensive. Illustrative embodiments provide techniques for merging N-gram indexes that are flexible with respect to time and space complexity requirements, and are also adaptive to various system constraints.

In various information processing systems, such as log message collection and processing systems, extremely large sets of records or data need to be processed. The records or data may have arbitrary structure and content. In such information processing systems, value is provided when efficient search and query mechanisms are implemented that can retrieve records that satisfy various regular expressions. To facilitate arbitrary query, search, and retrieval, information processing systems may utilize indexing structures that extract N-grams of various lengths, and for each N-gram maintain a list of records that contain the corresponding string. When a query is made to the system, the index that contains the query string is fetched and the relevant records are retrieved.

Embodiments provide techniques for optimizing and reducing the space required for storage of the indexes built by the indexing structure. Thus, system performance is improved. In various embodiments described herein, the information processing system is assumed to comprise a query and retrieval system for building N-gram text indexes for messages collected by a message log concentrator of an enterprise network, where the volume of data produced by the system may be enormous. In such systems, the log messages may not have as diverse coverage of the English language as other systems (e.g., systems that collect newswire records). The number of N-grams may be on the order of tens to hundreds of millions. As such, the memory and storage used for the indexes to the corresponding N-grams can become expensive quickly as the number of records is vast. Some embodiments provide techniques for merging indexes associated with closely related N-grams using an efficient and flexible algorithm for identifying which indexes should be merged. In some embodiments, it is assumed that the indexes contain record identifiers which are in monotonically increasing order, which is a common practice.

One approach to the problem of providing an efficient indexing structure is to not merge indexes at all, but to instead extend the physical capabilities of the system (e.g., through addition of more memory and processing power).

Such an approach, however, is expensive to implement particularly as the amount of records or data being managed continues to grow.

Another possible approach for merging indexes is to compute the union of the records of the base indexes onto one larger index. Such an approach, however presents various issues related to index quality. For example, given an N-gram string abcde, should the index corresponding to abcde be combined with the indexes of all possible substrings thereof (e.g., abc, bcd, cde, abcd, bcde)? Such an approach does not consider when it would be wise to make such a combination, and when it would be inefficient. For example, straightforward merging would not account for the situation where the substring abc appears as a prefix to the N-gram abcfg, or where the substring cde is a prefix to the N-gram cdefg. Straightforward solutions of merging indexes can therefore introduce uncontrolled imprecision on the index quality, and may be expensive and inefficient.

In some embodiments, an efficient algorithm is provided for identifying sets of N-grams whose indexes should be merged. The decision for merging is made flexible, and can be adapted to the constraints of different systems. The algorithm may be viewed as comprising three phases, an N-grams selection phase, a base merging phase, and a residual merging phase.

During the N-grams selection phase, all N-grams whose indexes exceed some threshold size are selected. The threshold size may be a value V that is determined by the algorithm as will be described in further detail below. Some embodiments select only the N-grams whose indexes exceed the threshold size based on an intuition that indexes whose sizes are small will not benefit from merging, as they do not consume substantial space. Indexes of large size that correspond to special N-grams are likely to have substantial overlap and are thus good candidates for merging, thus reducing the space required to store the indexes. The N-grams identified during the N-grams selection phase are placed in separate data structures based on the length of their strings, so that the base merging phase and residual merging phase can be performed in a computationally efficient manner.

In the base merging phase, a "base" strategy is used for merging indexes. The base strategy scans all N-grams of length l, where l is equal to the length of the longest N-gram maintained by the index. For example, if the indexing structure builds N-grams for N=3, 4 and 5, the base merging phase goes through all N-grams of size 5. The index corresponding to each substring of the l-length N-gram is inspected and a decision is made as to whether the indexes should be merged based on the sizes of the corresponding indexes.

In the residual merging phase, a "residual" strategy is used for merging indexes. The residual strategy is performed on all N-grams of shorter length that were not inspected or merged during the base merging phase. For those N-grams and their substrings, a similar test based on the relative sizes of the indexes is made to determine if the corresponding indexes should be merged or not.

Additional details regarding the N-grams selection phase, base merging phase and residual merging phase will be provided below. Algorithms used in some embodiments adaptively merge selected indexes to optimize the index structure. Some embodiments provide solutions that may be used in a wide variety of information processing systems and use case scenarios, including in systems with constrained vocabularies but with a vast collection of records to be indexed. As noted above, various embodiments are described herein with respect to a transaction processing system and log message concentrators. Embodiments, however, may be used with various other types of systems and use case scenarios.

In some embodiments, the algorithm determines when to merge based on an observation or determination that the relative sizes of the indexes and their content is related. Consider an arbitrary 5-gram string bound. Suppose that bound appears in k records, and therefore the length of its index is k. Consider all proper substrings of bound, and let such substrings be $s_j$ and denote by $k_j$ the number of times each proper substring $s_i$ appears in the collection of text records or data being considered. For the 5-gram string bound, let $s_{j=1}^5$={bou,boun,ound,oun,und}. Note that in this example, the index associated with bound is a subset, but not necessarily a proper subset, of all indexes associated with $s_j$, and therefore the size of the indexes of $s_j$, $k_j$ is greater or equal to the size of the index of bound, that is, $k \le k_j$, j=1, 2,3, 4,5 (e.g., the text record that contains a given superstring will also contain every sub string of that superstring). If the size of the index of a superstring is the same as that of a substring, then their content will also be the same and thus the indexes for the superstring and that substring may be merged. In the example above for bound, assuming the size of the index for bound is the same as the size of the indexes for each of the substrings bou, boun, ound, oun and und, then those six indexes may be merged and replaced with one index, thus saving storage or memory resources required for the indexing structure by removing five superfluous indexes.

Now consider the case when the sizes of the indexes of one or more of the sub strings are greater than the size of the superstring. Continuing with the example above, assume that the word undefined is part of the $k_u$ text records in the collection. In that case the index for the substring und, in addition to all records that contain bound, will also contain pointers to all the records that contain undefined (e.g., $k_5$=k+$k_u$). In this case, the decision to merge indexes may be based on the ratio $$\frac{(k+k_u)}{k} = 1 + \frac{k_u}{k}.$$

In particular, the decision to merge may be based on the value of $$\frac{k_u}{k} = \frac{(k+k_u)}{k} - 1.$$

If the requirements for the retrieval of the records relevant to a given query are such that record filtering can be done sufficiently fast, then these indexes can be merged and the threshold for making a merging decision is system dependent (e.g., based on the ability of the system to perform record filtering in some threshold time). The ratio of $k_u/k$ reflects the imprecision introduced by merging indexes. If the ratio is small, then the overlap of indexes is large and the merging of indexes will save space. Conversely, if the ratio is big then merging will introduce imprecision. The threshold for merging depends on the system's ability to filter irrelevant records for a given query and the computational resources available. The test of comparing the size of the indexes of all the substrings of a given N-gram substring is a basis of the algorithm.

Let A be the array of all N-grams. Suppose $A_i$ is the N-gram being considered, then $|Ind(A_i)|$ denotes the length (e.g., measured as a number of records) of the index associated with stored in memory (e.g., on disk). Note that if A is a tree structure, the algorithm below would not be changed as all we need to perform on A is a tree traversal operation which can be done in linear time in the size of the tree.

The algorithm may use two parameters, V and T. V (e.g., a size threshold) controls the time complexity of the algorithm, and T (e.g, a merging threshold or thresholds) is a threshold or thresholds that control the precision of merging. There may be multiple merging thresholds T, where each merging threshold $T_i$ is associated with a different length substring. The V and T parameters may be set to values to satisfy a set of desired or specified system constraints.

The parameter V may be defined to be the number of indexes to be inspected for merging. In some embodiments, V is chosen to be a constant, where V=K-th order statistics of the sizes of the indexes of A. In this case, it is assumed that the algorithm should inspect N-grams whose indexes are greater than the value of the K-th order statistics. Finding the K-th order statistics is $O(|A|)$ and does not require the array A to be sorted according to the sizes of the N-gram indexes.

In other embodiments, V is chosen based on or depending on the size of A. In various use case scenarios, it may be observed that the N-gram distribution is not uniform. For example, in some systems (e.g., in log message collecting systems), the sizes of indexes may be skewed such that a relatively small number or percentage (e.g., 3% of the indexes) use a comparatively large portion of the index storage space (e.g., more than 90%). By appropriately selecting the value for V (e.g., choosing V=1000), the algorithm will select a small amount or percentage of the N-grams (e.g., fewer than 3%). The selected N-grams, however, will use storage that exceeds by order of magnitude the storage used by the remaining unselected N-gram indexes (e.g., the remaining 97%).

The thresholds T are used to govern index-merging decisions. The closer to 0 a particular threshold is, the higher the precision of index merging $T_1, T_2, \in (0,1]$, but the fewer the indexes will be merged and therefore less space will be freed. Possible values for the thresholds T include 0.5, 1, 1.5, 2, etc. The choice of the value for thresholds T may be based on the particular system and use case scenario.

An algorithm for N-gram index merging will now be described, which takes as input A, V, $T_1$, and $T_2$. It is assumed in the example below that the index merging structure maintains indexes for N-grams where N=3, 4 and 5. It should be appreciated, however, that indexing structures are not limited to maintaining indexes for 3-grams, 4-grams and 5-grams, and that longer or shorter length N-grams indexes may be maintained as desired.

During initialization, a new hash table M is created for merged s-gram indexes. In the hash table M, keys are N-gram strings, and values are index address, location and/or identifier. Initially, the hash table M is empty.

The algorithm then proceeds to candidate N-gram and index selection (e.g., the N-grams selection phase). The array A is scanned to create $H_3$, $H_4$, $H_5$, which are hash tables of N-grams subject to the following constraints. Let $H_5$ be a hash table or an array of all 5-grams whose indexes are higher or equal to V. Let $H_4$ be a hash table of all 4-grams whose indexes are higher or equal to V. Let $H_3$ be a hash table of all 3-grams whose indexes are higher or equal to V. The hash tables $H_i$ are keyed by N-gram strings; the values are the sizes of the corresponding indexes. Constructing $H_i$ requires traversal of A (e.g., linear time in the size of A).

Next, the algorithm proceeds to the base merging phase. In the base merging phase, for each 5-gram, let that be $S=c_1 c_2 c_3 c_4 c_5$, in $H_5$:
1. Initialize $I \leftarrow \emptyset$.
2. Identify all sub-strings $S1=c_1 c_2 c_3 c_4$; $S2=c_1 c_2 c_3$; $S3=c_2 c_3 c_4 c_5$; $S4=c_2 c_3 c_4$; $S5=c_3 c_4 c_5$.
If $|Ind(S1)|>0$ and $$\frac{|Ind(S1)|}{|Ind(S)|} - 1 < T_1,$$

then add S1 to I and remove S1 from $H_4$.
If $|Ind(S2)|>0$ and $$\frac{|Ind(S2)|}{|Ind(S)|} - 1 < T_2,$$

then add S2 to I and remove S2 from $H_3$.
If $|Ind(S3)|>0$ and $$\frac{|Ind(S3)|}{|Ind(S)|} - 1 < T_1,$$

then add S3 to I and remove S3 from $H_4$.
If $|Ind(S4)|>0$ and $$\frac{|Ind(S4)|}{|Ind(S)|} - 1 < T_2,$$

then add S4 to I and remove S4 from $H_3$.
If $|Ind(S5)|>0$ and $$\frac{|Ind(S5)|}{|Ind(S)|} - 1 < T_2,$$

then add S5 to I and remove S5 from $H_3$.
3. If I is not empty, then add S to I and merge indexes of all N-grams in I (e.g., using almost sorted arrays, this may be performed in linear time in the size of the indexes) to one index inx(I). Add all N-grams in I to M and point to the merged index inx(I). Release all memory and space associated with indexes in I. Empty I.

Once the above is performed for each 5-gram, the algorithm proceeds to the residual merging phase. In the residual merging phase, if the $H_4$ hash table is not empty, then the above process is performed for each 4-gram, let that be $S=c_1 c_2 c_3 c_4$, remaining in $H_4$ as follows:
1. Initialize $I \leftarrow \emptyset$.
2. Identify two sub-strings, $S1=c_1 c_2 c_3$ and $S2=c_2 c_3 c_4$.
If $|Ind(S1)|>0$ and $$\frac{|Ind(S1)|}{|Ind(S)|} - 1 < T_2,$$

then add S1 to I and remove S1 from $H_3$.
If $|Ind(S2)|>0$ and $$\frac{|Ind(S2)|}{|Ind(S)|} - 1 < T_2,$$

then add S2 to I and remove S2 from $H_3$.

3. If I is not empty, then add S to I and merge indexes of all N-grams in I (e.g., using almost sorted arrays, this may be performed in linear time in the size of the indexes) to one index inx(l). Add all N-grams in I to M and point to the merged index inx(l). Release all memory and space associated with indexes in I. Empty I.

The output of the algorithm is M.

Note that all queries to the hash tables $H_3$, $H_4$, or the array $H_5$, run in constant time O(1). Also note that the most computationally expensive operation is the linear scan of the index structure A. The algorithm does not require the index structure A to be alphabetically sorted according to the N-gram strings, nor does the algorithm require that the index structure A be numerically sorted according to the sizes of the corresponding indexes.

The aggressiveness of the merging is controlled by the magnitudes of the thresholds T, whose values can be set by a system architect or other authorized user. The values of the thresholds T may depend on the space requirements and the efficiency of the system in filtering out records during retrieval. The value of V which controls the number of indexes to be inspected for merging should also be selected by the system architect or other authorized user.

It should be noted that the effectiveness of the algorithm is independent of the order in which the N-grams are inspected during the base merging phase. The algorithm will identify the proper indexes to merge using the various thresholds regardless of the order in which the N-grams are considered. Continuing with the example above, suppose that the string bound appears in K records and the string undefined appears in M>>K records. In such a scenario, the index of the sub string and will not be merged with the index of the string bound even if bound was inspected before undef was inspected, because $$\frac{M}{K} \gg 2 = T_2.$$

In some embodiments, the above-described algorithm may be extended to provide additional functionality or improvements. For example, the algorithm may be parallelized efficiently. Suppose that a system has P processors or threads available for running the N-gram index merging algorithm. Instead of creating one set of hash tables $H_3$, $H_4$, $H_5$, the algorithm can create P sets of such hash tables, and create a partition of the sizes separated according to the hash tables based on the sizes of their indexes. For example, one set of hash tables may contain all N-grams whose index sizes are in the range (1000, 2000], and a second set of hash tables may contain all N-grams whose index sizes are in the range (2000,3000], etc. Then the P processors can simultaneously and independently operate each on an individual set of hashes, leading to speeds of P in the processing of the indexes. It should be noted that, when parallelizing as described above, some merging opportunities may be missed towards the boundaries of the ranges.

The algorithm was described above and defined with respect to N-grams where N was equal to 3, 4 and 5. Embodiments, however, are not limited solely to use in considering N-grams of these sizes. The algorithm and associated logic can be extended to longer N-grams, and the associated thresholds T can be adjusted to account for the longer N-grams.

As described above, the algorithm considers or uses the same thresholds for the size of the prefix and the suffix N-gram. In some embodiments, however, the suffix N-gram might be a prefix of another longer N-gram, and thus it may be advantageous to treat substrings that are prefixes and suffixes differently (e.g., through the use of different thresholds).

In some embodiments, the system performing the algorithm may be time constrained and the merging of indexes is expensive in terms of the computing resources required. In such systems, it may be desired to replace the base merging phase with the following while eliminating the residual merging phase. The base merging phase may be replaced with the following:

For all 5-grams $S=c_1c_2c_3c_4c_5$, let $S1=c_1c_2c_3c_4$ and $S2=c_2c_3c_4c_5$. Set the value of $m_1=m_2=0$.

If $|Ind(S1)|>0$ then $$m_1 = \frac{|Ind(S)|}{|Ind(S1)|}.$$

If $|Ind(S2)|>0$ then $$m_2 = \frac{|Ind(S)|}{|Ind(S2)|}.$$

If $m_1>m_2$,
then if $(m_1>T_1)$ then add S1 to I, remove S1 from $H_4$, and inx(I)←inx(S1);
else if $(m_2>T_1)$ then add $S_2$ to I, remove S2 from $H_4$, and inx(I)←inx(S2).

Note that this test releases the space of one index for each 5-gram in the system, provided the threshold text succeeds with a superset index that contains all records. No index merging is required, and the memory space required by some of the indexes is freed. The computational cost of merging will be 0.

Embodiments provide efficient techniques for merging of N-gram indexes which are flexible, parallelizable, and adaptive to system constraints. Some embodiments are particularly suited for optimizing N-gram text indexing structures, such as those used for massive collections of records obtained from log message concentrators. Embodiments, however, may be used for various other types of system in which it is desired to save space in memory or storage by merging indexes in an indexing structure.

It is to be appreciated that the particular advantages described above and elsewhere herein are associated with particular illustrative embodiments and need not be present in other embodiments.

Also, the particular types of information processing system features and functionality as illustrated in the drawings and described above are exemplary only, and numerous alternative arrangements may be used in other embodiments.

The information processing systems disclosed herein are illustratively implemented using one or more processing platforms, examples of which will be now be described in greater detail. A given such processing platform comprises at least one processing device comprising a processor coupled to a memory.

As mentioned previously, portions of an information processing system as disclosed herein illustratively comprise cloud infrastructure. The cloud infrastructure in some embodiments comprises a plurality of containers implemented using container host devices and may additionally or alternatively comprise other types of virtual resources such as virtual machines implemented using a hypervisor. Such cloud infrastructure can therefore be used to provide what is also referred to herein as a cloud computing environment. A given cloud computing environment may but need not accommodate multiple tenants.

The cloud infrastructure mentioned above may represent at least a portion of one processing platform. Another example of such a processing platform is a plurality of processing devices which communicate with one another over a network. Each such processing device comprises at least one processor coupled to at least one memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment.

Cloud infrastructure as disclosed herein can include cloud-based systems such as an Amazon Web Services (AWS) system. Other examples of cloud-based systems that can be used to implement at least portions of system 100 include Google Cloud Platform (GCP) and Microsoft Azure. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux container (LXC). The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 3 and 4. Although described in the context of system 100, these platforms may also be used to implement at least portions of other information processing systems in other embodiments.

Figure 3:
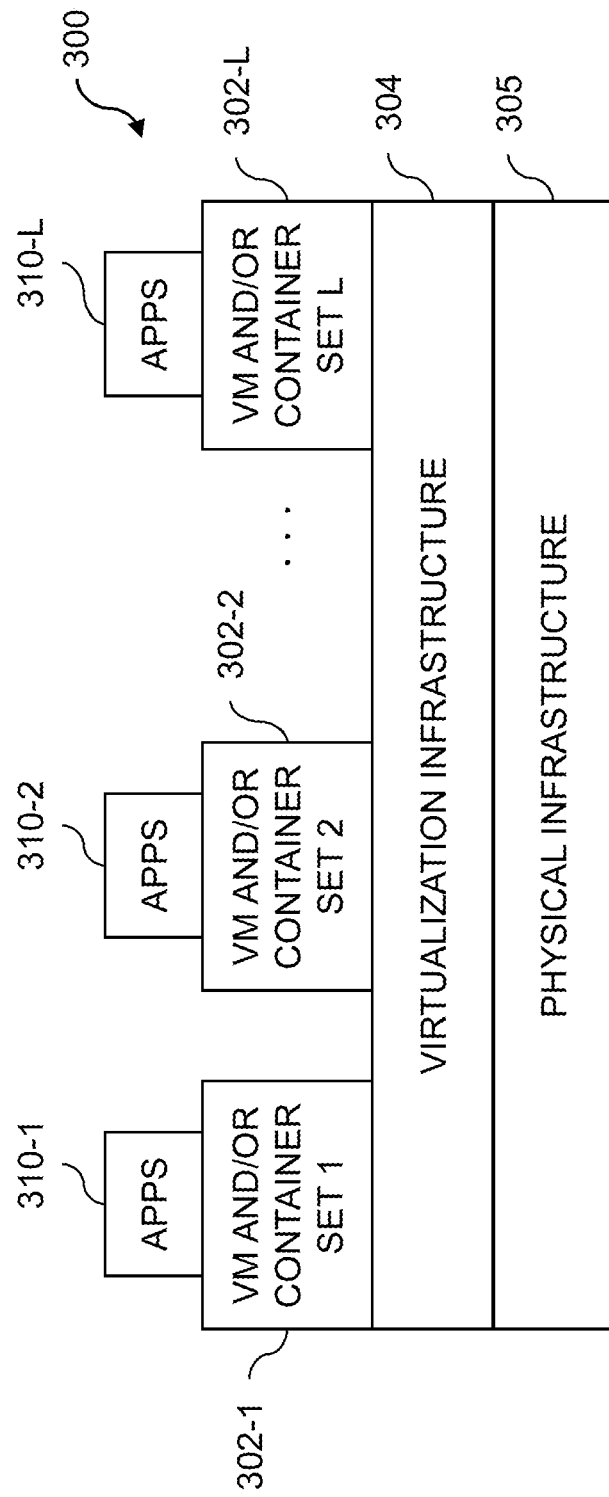
FIGS. 3 and 4 show examples of processing platforms that may be utilized to implement at least a portion of the FIG. 1 system.
Figure 4:
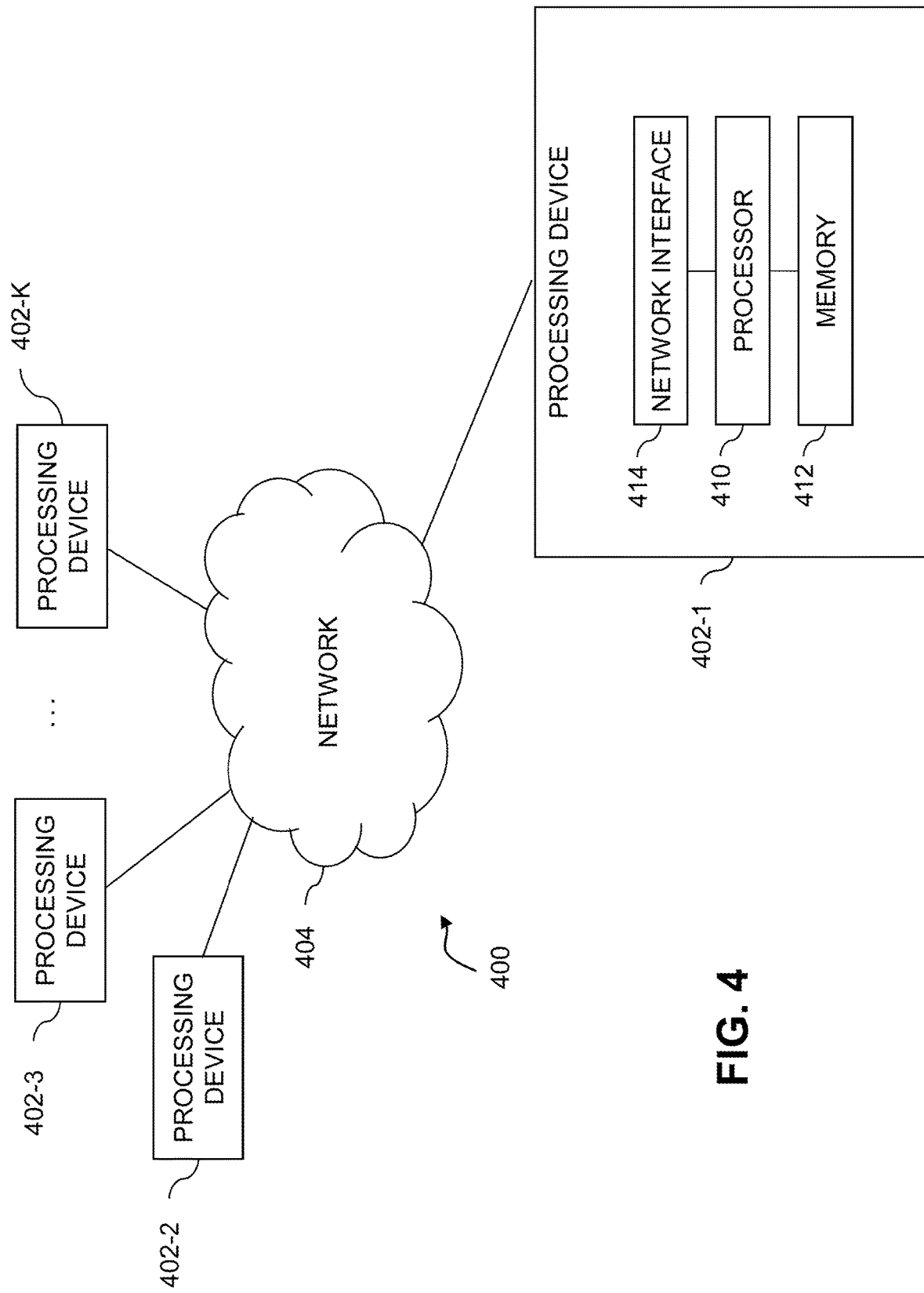

FIG. 3 shows an example processing platform comprising cloud infrastructure 300. The cloud infrastructure 300 comprises a combination of physical and virtual processing resources that may be utilized to implement at least a portion of the information processing system 100. The cloud infrastructure 300 comprises multiple virtual machines (VMs) and/or container sets 302-1, 302-2, . . . 302-L implemented using virtualization infrastructure 304. The virtualization infrastructure 304 runs on physical infrastructure 305, and illustratively comprises one or more hypervisors and/or operating system level virtualization infrastructure. The operating system level virtualization infrastructure illustratively comprises kernel control groups of a Linux operating system or other type of operating system.

The cloud infrastructure 300 further comprises sets of applications 310-1, 310-2, . . . 310-L running on respective ones of the VMs/container sets 302-1, 302-2, . . . 302-L under the control of the virtualization infrastructure 304. The VMs/container sets 302 may comprise respective VMs, respective sets of one or more containers, or respective sets of one or more containers running in VMs.

In some implementations of the FIG. 3 embodiment, the VMs/container sets 302 comprise respective VMs implemented using virtualization infrastructure 304 that comprises at least one hypervisor. Such implementations can provide functionality for adaptive index merging of the type described above for one or more processes running on a given one of the VMs. For example, each of the VMs can implement such functionality for one or more processes running on that particular VM.

An example of a hypervisor platform that may be used to implement a hypervisor within the virtualization infrastructure 304 is the VMware® vSphere® which may have an associated virtual infrastructure management system such as the VMware® vCenter™. The underlying physical machines may comprise one or more distributed processing platforms that include one or more storage systems.

In other implementations of the FIG. 3 embodiment, the VMs/container sets 302 comprise respective containers implemented using virtualization infrastructure 304 that provides operating system level virtualization functionality, such as support for Docker containers running on bare metal hosts, or Docker containers running on VMs. The containers are illustratively implemented using respective kernel control groups of the operating system. Such implementations can provide functionality for adaptive index merging of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

The processing platform 400 in this embodiment comprises a portion of system 100 and includes a plurality of processing devices, denoted 402-1, 402-2, 402-3, . . . 402-K, which communicate with one another over a network 404.

The network 404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 402-1 in the processing platform 400 comprises a processor 410 coupled to a memory 412.

The processor 410 may comprise a microprocessor, a microcontroller, an application-specific integrated circuit (ASIC), a field-programmable gate array (FPGA) or other type of processing circuitry, as well as portions or combinations of such circuitry elements.

The memory 412 may comprise random access memory (RAM), read-only memory (ROM), flash memory or other types of memory, in any combination. The memory 412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for adaptive index merging as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, data management systems, indexing structures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
   extracting variable length strings from a corpus of text data;
   associating the extracted strings with respective indexes in an indexing structure, the indexes comprising identifiers for instances of the extracted strings in the corpus of text data;
   selecting a set of the strings from the indexing structure having corresponding indexes whose size exceeds a threshold size value;
   determining whether to merge a first index in the indexing structure corresponding to a first string of the selected set of strings with at least a second index in the indexing structure corresponding to a second string of the selected set of strings that is a substring of the first string, wherein the determination is based at least in part on a comparison of a first size of the first index characterizing a first number of times that the first string occurs in the corpus of text data, a second size of the second index characterizing a second number of times that the second string occurs in the corpus of text data, and a threshold merging value associated with a length of the second string;
   merging the first index and the second index to create a merged index in the indexing structure responsive to the determination; and
   processing one or more queries to the corpus of text data received from one or more client devices utilizing the indexing structure with the merged index;
   wherein the comparison is based at least in part on comparing the threshold merging value to a ratio of the first size of the first index to the second size of the second index, the ratio of the first size of the first index to the second size of the second index characterizing overlap between instances of the first string and the second string in the corpus of text data;
   wherein the first size of the first index is different than the second size of the second index; and
   wherein the method is performed by at least one processing device comprising a processor coupled to a memory.

2. The method of claim 1 wherein the merged index reduces storage resources required to store the indexing structure.

3. The method of claim 1 wherein the threshold merging value is based at least in part on whether the second string is a suffix or a prefix of the first string.

4. The method of claim 1 wherein the indexing structure is maintained by a log message concentrator system.

5. The method of claim 1 wherein the extracted variable length strings comprise N-grams.

6. The method of claim 1 wherein the threshold merging value associated with the length of the second string is determined based at least in part on a computational time associated with filtering results for a given one of the one or more queries specifying the first string, wherein filtering the results for the given query comprises removing one or more results returned from the merged index that match the second string but not the first string.

7. The method of claim 5 wherein the determining and merging are repeated for two or more of the set of strings, starting with N-grams having a longest length maintained by the indexing structure, and continuing with N-grams having shorter lengths with corresponding indexes not already merged with an index of an N-gram having the longest length.

8. The method of claim 5 further comprising generating respective data structures for each of two or more values of N and placing selected N-grams into the data structures corresponding to the lengths of the selected N-grams.

9. The method of claim 8 wherein the data structures comprise a set of two or more hash tables each comprising N-grams for a value of N whose indexes have a size that exceeds the threshold size value.

10. The method of claim 9 wherein the first string comprises an N-gram having a longest length maintained by the indexing structure, and wherein the determining and merging comprises:
  initializing an indexing merging array;
  identifying a set of substrings of the first string;
  for each of the identified set of substrings, determining whether: (i) a size of the index corresponding to that sub string is greater than zero; and (ii) a size of the index corresponding to that sub string divided by a size of the index corresponding to the first string minus one exceeds a designated threshold merging value associated with the length of that substring;
  for each substring for which (i) and (ii) is true, adding that substring to the index merging array and removing that sub string from the hash table comprising N-grams for the length of that sub string; and
  if the indexing merging array is not empty, adding the first string to the index merging array, merging indexes for the substrings in the index merging array with the index for the first string to form the merged index, adding the first string and the sub strings in the index merging array to a new hash table for merged indexes, and releasing storage resources associated with the indexes of the first string and the substrings in the index merging array.

11. The method of claim 10 further comprising repeating the determining and merging for at least a third string not part of the merged index that has a length shorter than that of the first string by:
  initializing a new index merging array;
  identifying a set of substrings of the third string;
  for each of the identified set of substrings, determining whether: (i) a size of the index corresponding to that sub string is greater than zero; and (ii) a size of the index corresponding to that substring divided by a size of the index corresponding to the third string minus one exceeds a designated threshold merging value associated with the length of that substring;
  for each substring for which (i) and (ii) is true, adding that substring to the new index merging array and removing that substring from the hash table comprising N-grams for the length of that substring; and
  if the new indexing merging array is not empty, adding the third string to the new index merging array, merging indexes for the sub strings in the new index merging array with the index for the third string to form another merged index, adding the third string and the sub strings in the new index merging array to the new hash table for merged indexes, and releasing storage resources associated with the indexes of the third string and the substrings in the new index merging array.

12. The method of claim 9 wherein the first string comprises an N-gram having a longest length maintained by the indexing structure, and wherein the determining and merging comprises:
  initializing an index merging array;
  identifying a first substring comprising a beginning portion of the first string and a second substring comprising an ending portion of the first string;
  determining whether a size of the index corresponding to the first substring is greater than zero, and if so setting a first value equal to a ratio of a size of the index of the first string to a size of the index of the first substring;
  determining whether a size of the index corresponding the second sub string is greater than zero, and if so setting a second value equal to a ratio of the size of the index of the first string to a size of the index of the second substring;
  if the first value is greater than the second value and another threshold merging value associated with the length of the first sub string, adding the first string and the first sub string to the index merging array, removing the first sub string from the hash table comprising N-grams for the length of the first sub string, and releasing storage resources associated with the indexes of the first string and the first substring in the index merging array;
  if the second value is greater than the first value and the threshold merging value associated with the length of the second sub string, adding the first string and the second sub string to the index merging array, removing the second substring from the hash table comprising N-grams for the length of the second substring, and releasing storage resources associated with the indexes of the first string and the second sub string in the index merging array.

13. The method of claim 5 wherein selecting the set of strings comprises scanning the extracted N-grams to create two or more sets of hash tables, each set of hash tables comprising a hash table for N-grams for different values of N, a first one of the two or more sets of hash tables comprising N-grams whose indexes have a size in a first range and a second one of the two or more sets of hash tables comprising N-grams whose indexes have a size in a second range, and further comprising performing the determining and merging in parallel for the first string from one of the first set of hash tables and at least a third string from one of the second set of hash tables.

14. A computer program product comprising a non-transitory processor-readable storage medium having stored therein program code of one or more software programs, wherein the program code when executed by at least one processing device cause the at least one processing device:

to extract variable length strings from a corpus of text data;

to associate the extracted strings with respective indexes in an indexing structure, the indexes comprising identifiers for instances of the extracted strings in the corpus of text data;

to select a set of the strings from the indexing structure having corresponding indexes whose size exceeds a threshold size value;

to determine whether to merge a first index in the indexing structure corresponding to a first string of the selected set of strings with at least a second index in the indexing structure corresponding to a second string of the selected set of strings that is a substring of the first string, wherein the determination is based at least in part on a comparison of a first size of the first index characterizing a first number of times that the first string occurs in the corpus of text data, a second size of the second index characterizing a second number of times that the second string occurs in the corpus of text data, and a threshold merging value associated with a length of the second string;

to merge the first index and the second index to create a merged index in the indexing structure responsive to the determination; and to process one or more queries to the corpus of text data received from one or more client devices utilizing the indexing structure with the merged index;

wherein the comparison is based at least in part on comparing the threshold merging value to a ratio of the first size of the first index to the second size of the second index, the ratio of the first size of the first index to the second size of the second index characterizing overlap between instances of the first string and the second string in the corpus of text data; and wherein the first size of the first index is different than the second size of the second index.

15. The computer program product of claim 14 wherein the extracted variable length strings comprise N-grams, and wherein the determining and merging are repeated for two or more of the set of strings, starting with N-grams having a longest length maintained by the indexing structure, and continuing with N-grams having shorter lengths with corresponding indexes not already merged with an index of an N-gram having the longest length.

16. The computer program product of claim 14 wherein the merged index reduces storage resources required to store the indexing structure.

17. An apparatus comprising:

at least one processing device comprising a processor coupled to a memory;

the at least one processing device being configured:

to extract variable length strings from a corpus of text data;

to associate the extracted strings with respective indexes in an indexing structure, the indexes comprising identifiers for instances of the extracted strings in the corpus of text data;

to select a set of the strings from the indexing structure having corresponding indexes whose size exceeds a threshold size value;

to determine whether to merge a first index in the indexing structure corresponding to a first string of the selected set of strings with at least a second index in the indexing structure corresponding to a second string of the selected set of strings that is a substring of the first string, wherein the determination is based at least in part on a comparison of a first size of the first index characterizing a first number of times that the first string occurs in the corpus of text data, a second size of the second index characterizing a second number of times that the second string occurs in the corpus of text data, and a threshold merging value associated with a length of the second string;

to merge the first index and the second index to create a merged index in the indexing structure responsive to the determination; and to process one or more queries to the corpus of text data received from one or more client devices utilizing the indexing structure with the merged index;

wherein the comparison is based at least in part on comparing the threshold merging value to a ratio of the first size of the first index to the second size of the second index, the ratio of the first size of the first index to the second size of the second index characterizing overlap between instances of the first string and the second string in the corpus of text data; and wherein the first size of the first index is different than the second size of the second index.

18. The apparatus of claim 17 wherein the extracted variable length strings comprise N-grams, and wherein the determining and merging are repeated for two or more of the set of strings, starting with N-grams having a longest length maintained by the indexing structure, and continuing with N-grams having shorter lengths with corresponding indexes not already merged with an index of an N-gram having the longest length.

19. The apparatus of claim 17 wherein the merged index reduces storage resources required to store the indexing structure.

20. The apparatus of claim 17 wherein the threshold merging value is based at least in part on whether the second string is a suffix or a prefix of the first string.

\* \* \* \* \*